March 4, 1969     S. D. POOL ET AL     3,430,583

WAFERIZING MACHINE

Filed March 7, 1967

INVENTORS
STUART D. POOL
JAMES MORKOSKI

BY

ATTY.

United States Patent Office 3,430,583
Patented Mar. 4, 1969

3,430,583
WAFERIZING MACHINE
Stuart D. Pool, Naperville, and James Morkoski, Clarendon Hills, Ill., assignors to International Harvester Company, Chicago, Ill., a corporation of Delaware
Filed Mar. 7, 1967, Ser. No. 621,190
U.S. Cl. 107—8                                16 Claims
Int. Cl. B02c 11/08; B30b 15/34, 15/26

ABSTRACT OF THE DISCLOSURE

A machine for pressing hay in a closed-end die into a cohesive self-sustaining wafer. A rotatable wafer wheel cooperatively arranged with a press wheel for squeezing hay therebetween at extreme pressures and an endless flexible band cooperative with the wafer wheel for maintaining a dwell-time pressure function in sequential order to form cohesive self-sustaining wafers of hay.

BACKGROUND OF THE INVENTION

This invention pertains to the field wafering of hay and utilizes a closed-end die process.

The advent of field wafering of hay as a means for handling forage crops has introduced problems not previously encountered in the farm implement industry. The chief advantage of handling hay in the form of wafers is that it allows complete mechanization of hay handling from the windrow to the feed bunk and greatly increases the efficiency of transportation and storage facilities. In order to attain the degree of compression required to form wafers, the equipment must be designed to withstand extreme pressures. The energy expended in forming the wafers is substantially greater than that required for hay balers. The obvious result is the cost of constructing and operating a field wafering machine is substantially greater than that of ordinary balers, a factor which to a certian extent has retarded the commercial exploitation of the field wafering machine.

The density and the self-sustaining characteristics of the wafer is a function of press pressure and dwell-time; increase of the latter permits a decrease of the former for identical wafer characteristics. The present invention involves a unique method for applying a press pressure of short duration and maintaining a relatively long dwell-time pressure, thereby producing a dense, cohesive, self-sustaining wafer which in many respects is superior to those produced by presently known machines. Furthermore, efficient application of the dwell-time pressure permits reductions in press pressure without sacrificing wafer quality, and hence allows the use of lighter equipment and a smaller engine. The resultant increased mobility and decreased costs will place the field wafering machine in a more favorable competitive position with the hay baler.

SUMMARY

The wafering machine contemplated in the present invention employs a closed-end die process for forming wafers. This method is distinguishable over the other methods of forming wafers chiefly on the basis of the means for applying the press and dwell-time pressures.

The machine in one embodiment is characterized as having opposed rollers constituting a press zone and a flexible band engageable about the periphery of one roller and therewith defining a dwell-time zone. The pressures impressed in the press zone and the dwell-time zone are independently and automatically controlled so that a wafer of desired characteristics may be produced by adjusting these two parameters at optimum settings.

Although the wafering machine described herein incorporates many novel features, the salient feature involves the unique means for applying and maintaining dwell-time pressure. The effect of dwell-time pressure upon the characteristics of the wafer has long been recognized, but no closed-end die machine has evolved in the industry which takes full advantage of this feature.

It is therefore an object of this invention to provide a closed-end die wafering machine having a press zone and a prolonged dwell-time zone.

Another object is the provision of means for simultaneously and independently controlling the pressures in the press zone and the dwell-time zone.

A still further object is the provision of means for controlling the wafering temperature.

Another object is to provide a closed-end die process for forming wafers of hay.

These and other objects may be had by referring to the following description and claims taken in conjunction with the drawings in which:

DESCRIPTION OF THE PREFERRED EMBODIMENT

First embodiment

*General description*

Figure 1:
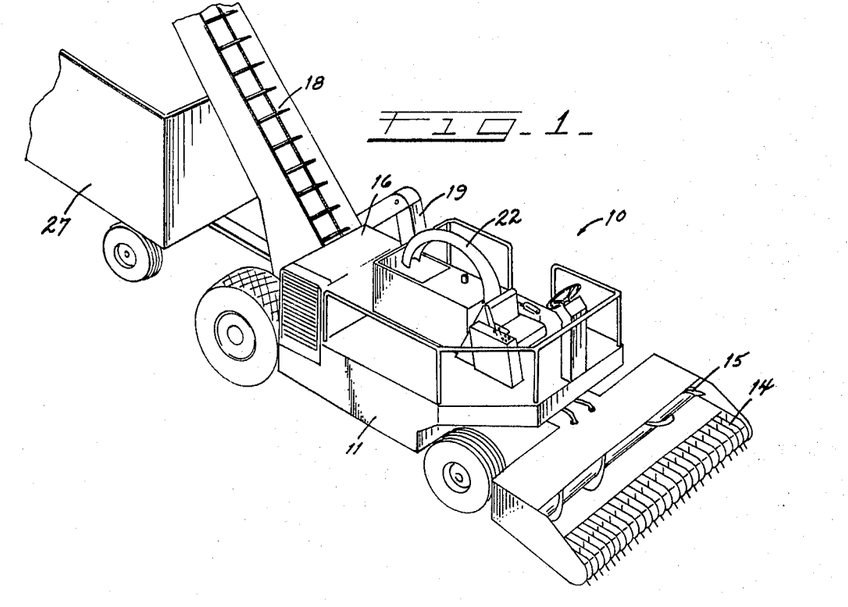
FIGURE 1 is a perspective view of the novel wafering machine constructed in accordance with the principles of the present invention.
Figure 2:
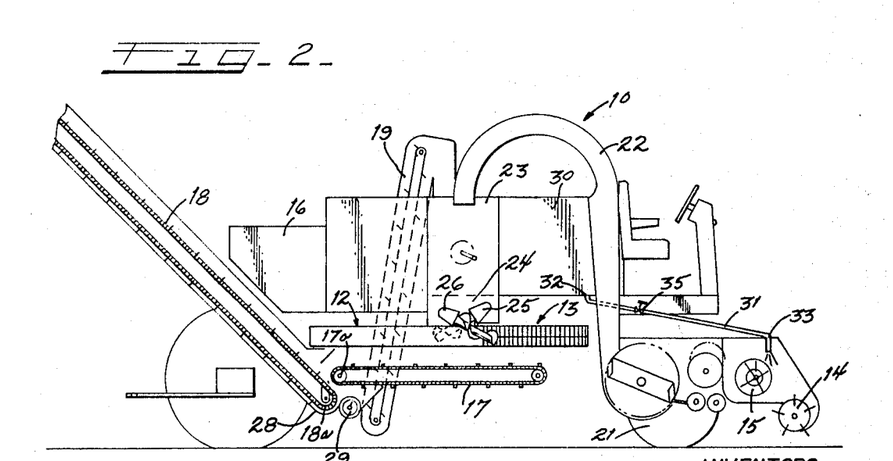
FIGURE 2 is an elevational view of FIGURE 1 diagrammatically presented for convenience of illustration.

FIGURES 1 and 2 present a wheel mounted field wafering machine 10 constructed in accordance with the principles of the present invention, it being understood that the same could be used in a stationary machine. As shown, a frame 11 carries the components of the machine which includes generally a pair of wafering units 12 and 13, a pickup unit 14, a feed unit 15, an engine 16, a horizontal conveyor 17, an elevator 18, and a recirculating elevator 19. As the invention is primarily directed at the waferizing unit, the other components are described only generally to indicate the environment in which the wafering units 12 and 13 operate.

The mobile unit 10 is adapted to be driven along the field in registry with windrows of hay. The pickup 14 lifts the windrowed hay from the ground and directs it rearwardly into the double feed auger 15 which forces the hay into a chopper unit, designated generally as 21. The chopped hay is then blown through duct 22 into a hopper 23 whence it is fed into a feed cavity 24 as disposed therebelow. A pair of feed augers 25 and 26 are mounted in the feed cavity 24 and serve to feed the hay into wafering units 12 and 13 wherein the hay is compacted into cohesive self-sustaining wafers and discharged onto the underlying conveyor 17. Conveyor 17 has one end 17a in normal alignment with a lower end 18a of the rearwardly inclined elevator 18. In normal operation the conveyor 17 transports and deposits wafers into conveyor 18 which lifts and discharges the wafer into a trailing wagon 27 towed by the wafering machine 10.

Wafer fines, which are portions of hay stems that break away from the wafers, are also transported and deposited onto elevator 18, but the fines drop into a pan 28 underlying end 18a and are forced into cross auger 29 which feeds the fines to the recirculation elevator 19. Elevator 19 returns the fines to hopper 23 and thus reduces waste.

The wafering machine 10 is also provided with water facilities for controlling moisture content of the hay. The water facilities include a water tank 30 and a water line 31 having one end connected to the tank 30 as at 32 and another, nozzled end 33, disposed above the pickup and feed unit 14 and 15. Valve 35 in the water line 31 is positioned conveniently near the operator for controlling water flow therethrough.

*Wafering units*

The wafer forming facility of the wafering machine 10 consists of two independently operated units 12 and 13 having interacting control means. As the following disclosure develops, it will be seen that each unit comprises generally a feed zone, a press zone, a dwell-time zone, and a discharge zone. Each of these zones represents a step in the process of forming a wafer.

Figure 3:
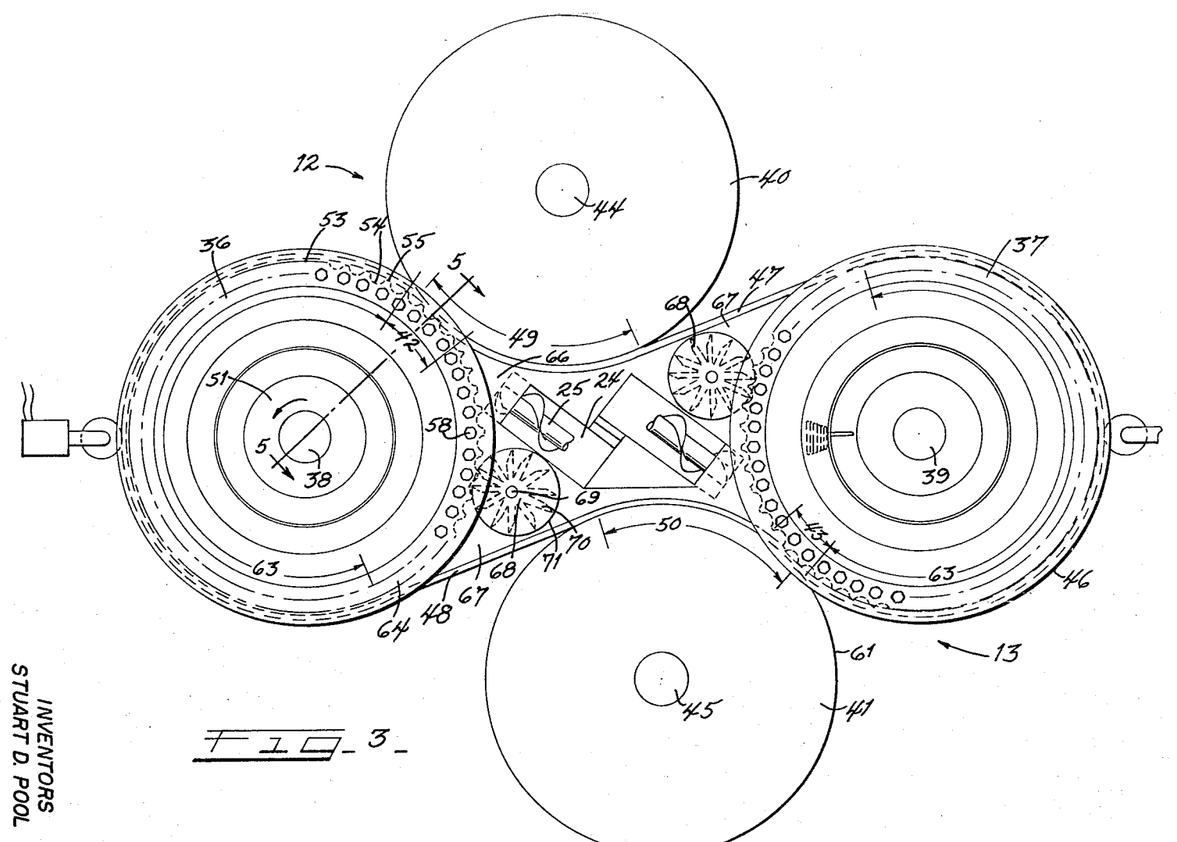
FIGURE 3 is a top plan view of the wafering units employed in the wafering machine shown in FIGURES 1 and 2.

With reference to FIGURE 3, a pair of coplanar wafer wheels 36 and 37 are mounted on upright shafts 38 and 39 which are respectively journaled to frame 11. The wafer wheels 36 and 37 are cooperatively arranged with companion press wheels 40 and 41, respectively, whereby each wafer wheel 36 or 37 and its corresponding press wheel 40 or 41 have confronting peripheral portions which prescribe a press zone therebetween. The press zone for the wafer wheel 36 and its companion press wheel 40 is designated as 42; and that for wafer wheel 37 and press wheel 41 as 43. The press wheels 40 and 41 are respectively mounted on upright shafts 44 and 45. Trained about the peripheries of wafer wheels 36 and 37 is a flexible endless band 46 forming runs 47 and 48. Run 47 engages a peripheral segment 49 of press wheel 40 and extends between the juxtapositioned wheels 36 and 40 through the press zone 42; and run 48 engages a peripheral segment 50 of press wheel 41 and extends between the juxtapositioned wheels 37 and 41 through press zone 43. As is discussed in more detail below, the band 46 engagement upon wheels 40 and 41, as denoted by references 49 and 50, respectively, provide frictional surfaces for rotating press wheels 40 and 41.

For the purpose of clarity and simplicity, only details of the wafering unit 12 comprising companion wheels 36 and 40 are discussed but like reference numerals are assigned to corresponding parts of wafering unit 13 comprising companion wheels 37 and 41.

Figure 5:
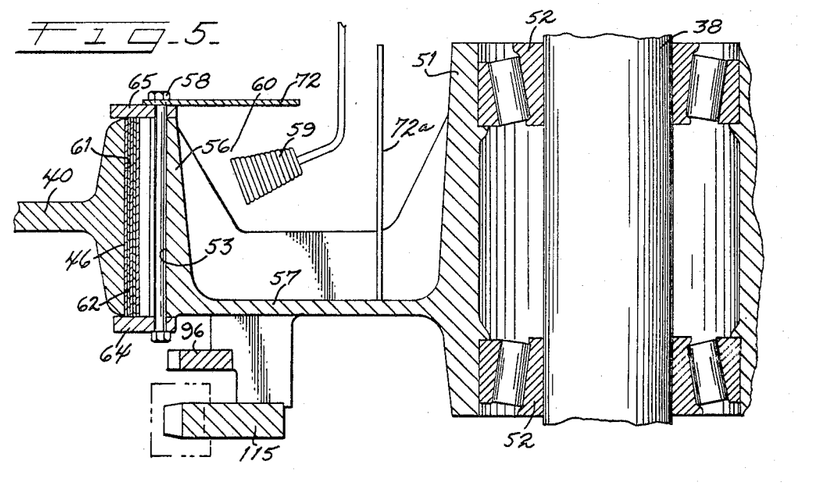
FIGURE 5 is an enlarged sectional view taken generally along line 5—5 of FIGURE 3, showing details of the wafering wheel.

As shown in FIGURES 3 and 5, wafer wheel 36 has a hub 51 journaled to shaft 38 by bearings 52. Hub 51 is integrally connected to a rim 56 by a radially extending wall 57. The radially outwardly facing circumference 53 of rim 56 serves as a wafer forming surface and may be of any suitable configuration. The preferred embodiment presented herein discloses a wafer forming surface 53 as having a plurality of circumferential spaced pockets 54 separated by a smooth circumferential shoulder 55. The pockets 54 are of general circular cross-section and extend axially with respect to wafer wheel 36.

A pair of annular flanges 64 and 65 are clamped to radial side portions of rim 56 by a plurality of bolt and nut combinations 58. Flanges 64 and 65 extend radially outwardly beyond the radial extent of wafer forming surface 53.

Press wheel 40 has a smooth peripheral surface 61 axially coextensive with the axial dimension of wafer surface 53. Press wheel 40 is placed in juxtaposition to the wafer wheel 36 so that the smooth peripheral surface 61 of the former fits between the annular flanges 64 and 65 secured to the latter. The confronting peripheries of the wafer wheel 36 and the press wheel 40 thus define the press zone 42 referred to above.

With reference to FIGURES 3 and 5, it will be seen that run 47 of the flexible band 46 has its outer surface in engagement with a peripheral portion of press wheel 40 as at 49 and extends between the confronting peripheries of wafer wheel 36 and press wheel 40. The band 46 continues contiguously around the wafer forming surface 53 encircling a segment of the periphery of wafer wheel 36. This encircled segment constitutes the dwell-time zone and is designated by reference character 63. The width of the band 46 is sufficient to substantially cover the axial dimension of the wafer forming surface 53 and yet allow free radial movement between the annular flanges 64 and 65. Note that the band 46 substantially overlays the wafer surface 53 in both the press zone 42 and dwell-time zone 63, so that once the hay reaches the press zone 42 it is subjected to a continuous pressure until it clears the dwell-time zone 63. Note also that the force of the press wheel 40 is borne by the outer surface of band 46.

As shown in FIGURE 5, the flexible band 46 consists of a plurality of individual continuous bands 62, preferably formed of steel. The bands 62 are stacked one on another and have their sides in longitudinal alignment, which is maintained by the confines of the annular flanges 64 and 65. The stack-up of individual bands provides for the necessary flexibility required for the present invention and allows for convenient and inexpensive replacement of worn out bands 62.

The feed auger 25 mounted in cavity 24 is oriented to feed hay into a feed zone 66 in advance of the press zone 42. The feed zone 66 is defined on one side by the inner surface of run 47 and on the other side by the wafer forming surface 53. The converging characteristic of the feed zone 66 results in a precompression of the hay. Upon reaching the feed zone 66, hay has been precompressed to approximately bale density (20 pounds per cubic foot).

Immediately after the dwell-time zone 63 in the direction of rotation of wafer wheel 36 (indicated by the arrow in FIGURE 3) is a wafer discharge zone 67 confined on one side by the inner surface of run 48 and on the other side by the wafer forming surface 53.

Figure 6:
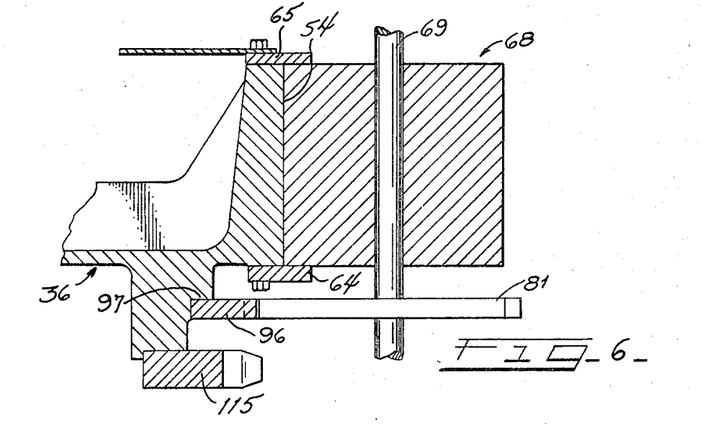
FIGURE 6 is an enlarged sectional view taken generally along line 6—6 of FIGURE 4, depicting the unique rotary scraper embodied in the present invention.

At the extreme pressure encountered in the press zone, the hay may be burned or fused to the pocket walls; consequently, a rotary scraper 68 is provided to scrape the circular pockets clean of any residual matter. As shown in FIGURES 3 and 6, the rotary scraper 68, mounted on a vertical shaft 69 which is journaled to frame 11, is disposed in the discharge zone 67. The scraper 68 has a plurality of radial arms 70, each of which have knife edges 71 that extend substantially the axial dimension of the wafer forming surface 53. The knife edge 71 is adapted to engage and scrape the entire area of the circular pockets 54 clean of any residual matter. The rotary scraper 68 is synchronized to operate in timed relation with wafer wheel 36 so that alternate pockets 54 are scraped. As best seen in FIGURE 6, a scraper wheel pinion 81 driven by an annular gear 96 attached to the wafer wheel 36 as at 97 provides the necessary timing and may be arranged so that every pocket or alternate pockets are scraped.

The provision of a scraper also increases the versatility of the machine by allowing immediate resumption of wafering operations following a long shut-down. Heretofore, machines employing a dwell-time zone, such as extrusion type machine, requires manual cleaning of the dies following a shut-down because the hay in the dwell-time zone sets up. In the present invention, the rotary scraper 68 automatically cleans the die pockets following shut-down.

*Wafer unit control*

Figure 4:
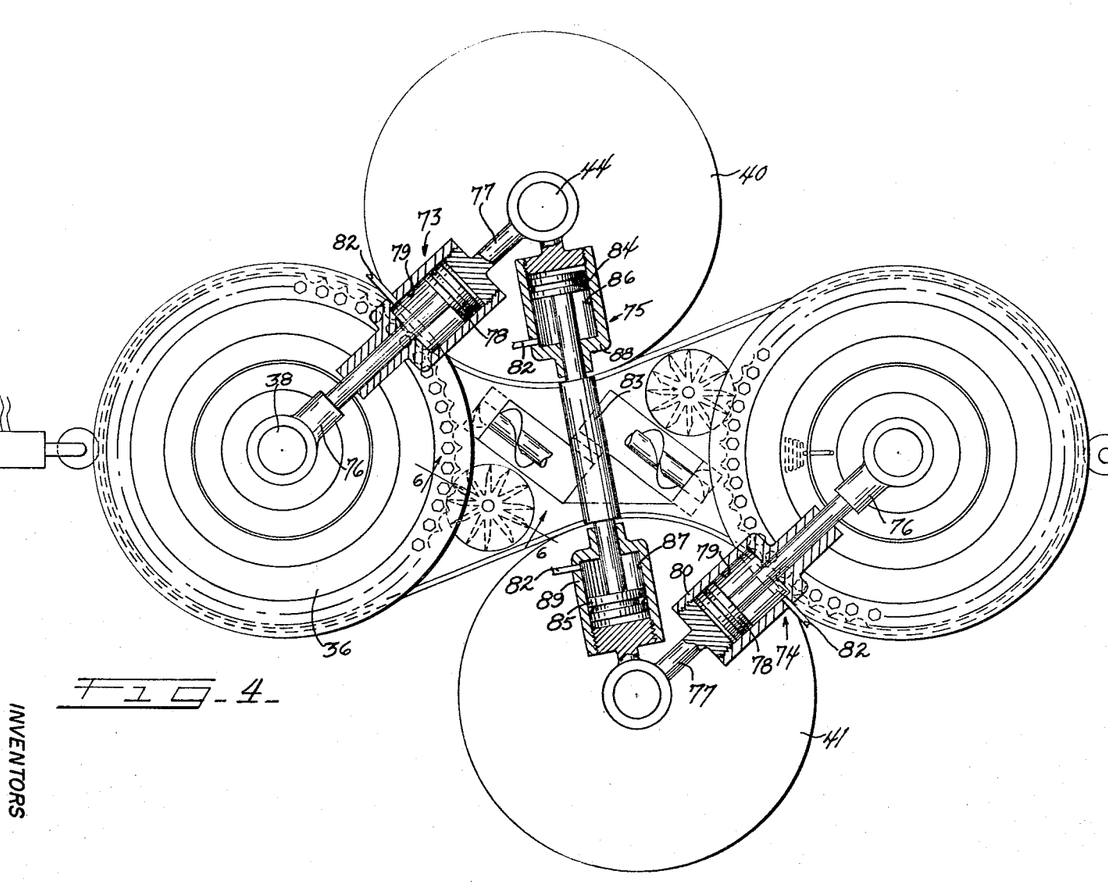
FIGURE 4 is a bottom plan view of the wafering units shown in FIGURE 3.

As shown in FIGURE 4, press wheels 40 and 41 are connected to their respective companion wafer wheels 36 and 37 through linkages 73 and 74, respectively, and are interconnected by linkage 75. The function of the linkages is to provide a means for maintaining and controlling pressures in the press zone 42 and dwell-time zone 63.

Linkages 73 and 74 are identical; therefore, only the former will be described but like reference numerals will be assigned to corresponding parts of the latter. Linkage 73 comprises briefly a wafer wheel arm 76 and a press wheel arm 77 extending respectively from the wafer wheel shaft 38 and the press wheel shaft 44, and are joined in a piston arrangement whereby press wheel 40 is movable relative to the wafer wheel 36. The arm 76 has one end pivotally attached to the shaft 38 and carries at its extended end a piston 78. The piston 78 moves within the confines of a cylinder 79 formed in a housing 80 which is threadedly connected at arm 77. Arm 77 is pivotally mounted on shaft 44. The cylinder 79 through line 82 is in pressure communication with a hydraulic accumulator 83a (shown in FIGURE 7) which maintains a desired pressure in cylinder 79. The cylinder pressure acting on piston 78 provides a bias force opposing movement of the press wheel 40 away from wafer wheel 36, and thus determines the magnitude of the press force in the press zone 42.

The wafer wheel 36 is stationary whereas press wheel 40 is movably relative thereto. Thus the linkage 73 in addition to functioning as a control means serves to support press wheel 40.

The press wheels 40 and 41 are interconnected by linkage 75 which includes a shaft 83 having pistons 84 and 85 mounted on its opposite ends thereof. Each of the pistons 84 and 85 are movable within the confines of cylinders 86 and 87, respectively, formed in housings 88 and 89. The housings 88 and 89 are respectively hinged to shafts 44 and 45.

Accumulator pressure, through lines 82, 82 is maintained in cylinders 86 and 87, and act upon pistons 84 and 85 in diametrically opposed directions so that the press wheels 40 and 41 are forced toward one another. The bias force thus created is opposed by the band 46; run 47 engaging press wheel 40 and run 48 engaging press wheel 41. It will be appreciated that the bias force acting upon band 46 determines the band tension and consequently the pressure in the dwell-time zone 63.

Now referring to the diagrammatic presentation of the hydraulic accumulator 83a (FIGURE 7), it will be seen that the accumulator pressure through lines 82, 82 is maintained in cylinders 79, 79, 86 and 87, and that the system pressure is maintained by hydraulic pump 90 fed by reservoir 91. Note that the pressure ratios of the press zone 42 and the dwell-time zone 63 is substantially constant because the hydraulic accumulator pressure is common to all the cylinders. The effective area of the pistons 78, 78, 84, and 85 and the accumulator pressure can be selected to give desired load characteristics.

Figures 7, 8, 9:
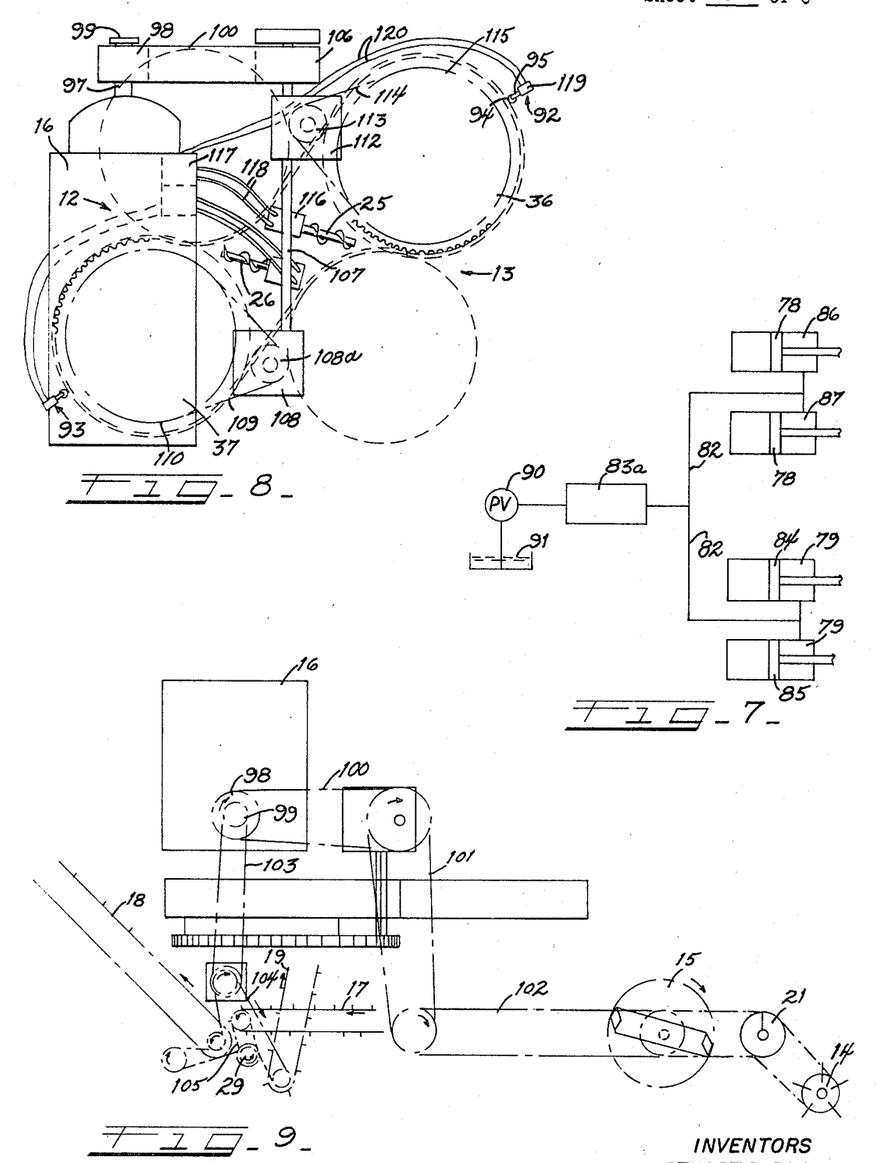
FIGURE 7 is a diagrammatic illustration of the hydraulic system used in the wafering units.
FIGURE 8 is a plan view of the waferizer with portions cut away illustrating the hydraulic control system.
FIGURE 9 is a diagrammatic illustration of the power train for driving the various components of the wafering machine.

It is apparent that the accumulator pressure determines both the pressure applied in the press zone 42 and that applied in the dwell-time zone 63. The preferred embodiment of the present invention contemplates a use of an accumulator pressure that provides a bias force in cylinders 78, 78 yieldable at a press pressure of approximately 5,000 p.s.i. and a bias force in cylinders 86 and 87 which results in a pressure of approximately 1,200 p.s.i. in the dwell-time zone 63.

In order to control the thickness of the wafers, each wafer unit 12 and 13 is provided with a sensing means designated respectively as 93 and 92 in FIGURE 8. Each sensing means 92 and 93 includes a follower 94 mounted on a follower arm 95 and rollably engageable with band 46 in the area of the dwell-time zone 63. The feed augers 25 and 26 are operatively responsive to their corresponding sensing means through a hydraulic drive system so that the feed rate as determined by the augers is a function of wafer thickness. It should be noted that the sensing means of each unit 92 and 93 operate their respective feed augers 25 and 26 independent of the other unit.

Detail description of the wafer thickness control is limited to wafer unit 13 with like reference numerals assigned to corresponding parts for wafer unit 12. Feed auger 25 is rotated by a hydraulic motor 116 hydraulically connected to variable displacement pump 117 through lines 118. The hydraulic pump 117 is operatively responsive through lines 120 to the sensing means 92 which includes a 4-way hydraulic valve 119.

The follower arm 95, sensing a change in the wafer thickness actuates the 4-way valve 119 sending a signal through lines 120 to the pump 117. The pump 117 in response to the signal adjusts the pumping rate to the motor 116 so that the feed auger 25 feeds hay at a rate which gives the desired wafer thickness.

In order to provide proper wafering temperature, a conventional butane burner 59 is disposed in the opening between rim 56 and hub 51 in the vicinity of feed zone 66 in both wafer wheels 36 and 37 (see FIGURE 5). The butane burner 59 is housed in an annulus 60 prescribed by the radially extending wall 57, the rim 56, a plate 72, and a heat reflector 72a. Heat reflector 72a is in the form of a cylinder and serves to protect the bearings 52. Note that the butane burner 59 remains stationary while the wafer wheel and attached parts rotate about shaft 38. In addition to controlling wafering temperature, use of the burners enables immediate commencement of wafering operations. In the presently known machines, wafering cannot be commenced until the machie has reached wafering temperature which occurs only after several minutes of operation.

*Power train*

As shown in FIGURES 8 and 9, the engine 16 provides the power for the various components of the machine 10. The engine drive shaft 97 carries power takeoff pulleys 98 and 99. Pulley 98, through a power train comprising belts 100, 101, and 102 drives the pickup 14, feed unit 15, and the chopper unit 21. Pulley 99 through a power train comprising V-belts 103, 104 and 105 provides drive means for the conveyor 17, elevators 18 and 19, and auger 29. It is believed that FIGURE 9 adequately discloses the structural features and operation of these power trains, and therefore this disclosure is not unnecessarily encumbered by a detailed description thereof.

Now referring to FIGURE 8, the multiple V-belt 100 interconnects pulleys 98 and 106 and serves to drive a transversely disposed shaft 107. The shaft 107 provides the power to rotate wafer wheels 36 and 37. With reference to wafer wheel 37, a right angle gear box 108 driven by shaft 107 has a horizontal sprocket 108a which drives a chain 109 which, in turn drives sprocket 110 connected to wafer wheel 37. Similarly, wafer wheel 36 is driven by power train comprising a right angle gear box 112, a gear box sprocket 113, a chain 114, and a wafer wheel sprocket 115 (see FIG. 5).

The frictional nonslippage engagement of band 46 upon wafer wheels 36 and 37 in the area prescribing dwell-time zones 63, 63 provides the motive force for propelling band 46; and the frictional engagement of band 46 upon press wheels 40 and 41 provides a nonslippage drive means for the press wheels 40 and 41.

*Operation*

With reference to FIGURE 3, let it be assumed that the hay has reached the hopper 23 in the manner described previously. The hay gravitates into the feed cavity 24 where the feed augers 25 and 26, operating independently of each other, feed the hay into the feed zone 66 at bale density. Owing to the particular configuration of the feed zone 66, the hay is compressed to near wafer density in advance of press zone 42. Wafer wheels 36 and 37 are driven counterclockwise as shown in FIGURE 3 and their respective companion wheels 40 and 41, through the band engagement, are driven clockwise.

In wafer unit 12, the hay is squeezed between the counter-rotating wheels 36 and 40, which represents the press zone 42, wherein the hay is subjected to a press pressure of approximately 5,000 p.s.i. Note that band 46 separates the press wheel 40 from the press zone 42 and closes over the wafer forming surface 53, trapping hay between the band 46 and the wafer surface 53. Thus it is seen that the hay is compressed into wafers having the shape of the pocket configuration and the individual wafers are interconnected by a thin annular layer formed over shoulder 55. The band 46 maintains this hold over the hay formed on the wafer surface in a frictionless engagement as the wafer wheel 36 continues rotation through the dwell-time zone 63. The band engagement upon the hay produces a less pressure than that in the press zone 42 but is sufficient to prevent springing back of the hay. The dwell-time pressure is maintained until the pockets 54 and shoulder 55 clear the circumferential dwell-time zone 63 and enter the discharge zone 67. In the discharge zone 67, the hay breaks in the area of the thin layer over the shoulder 55 and drops onto the underlying conveyor 17 and thence is transported and elevated to the trailing wagon 27.

The dwell-time to which each wafer is exposed is of course a function of wafer wheel size and rate of rotation. However, practical considerations such as wafer machine capacity and equipment size restrict the choice of wheel size and rate of rotation to practical limits. The present embodiment contemplates the use of wafer wheel 36 having a diameter of 36 in. which is rotated at 16 r.p.m. giving a dwell-time of 2.7 sec. A machine with these characteristics will give a capacity of 10 tons of hay per hour.

If the hay is subjected to a dwell-time pressure for a prolonged period such as will occur during shut-down time, it sets up and consequently may not freely break away from pockets 54. In this event rotary scrapers 68 which operate in timed relation with the wafer wheel 36, scrape alternate pockets.

If too much hay is fed into the unit, wafers become too thick. The sensing means 92 detects the increased thickness and slows down the auger 25 through the hydraulic system.

Summarizing the wafer process, the loose hay is gathered, chopped, subjected to an extreme pressure for a short period of time, subjected to a reduced pressure for a prolonged period of time, and discharged as a cohesive self-sustaining wafer.

Operation of wafer unit 13 is similar to that described for wafering unit 12.

SECOND EMBODIMENT

Figure 10:
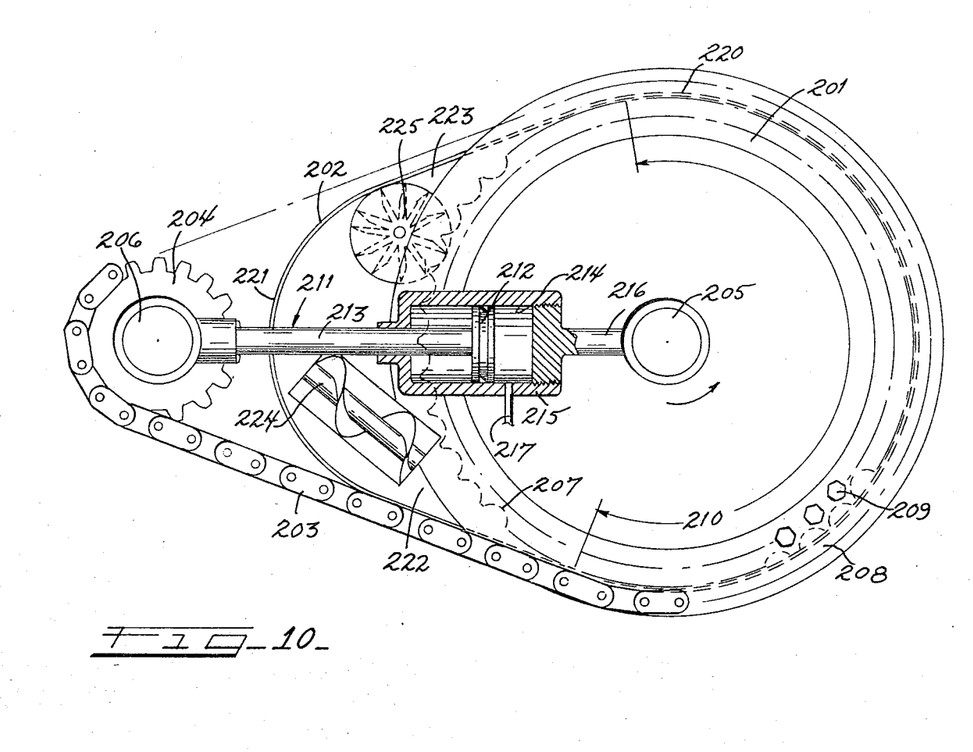
FIGURE 10 is a plan view of another embodiment of the wafering unit used in the wafering machine.

FIGURE 10 presents another embodiment of the present invention and differs from the first embodiment principally by the means for applying the press pressure. The first embodiment utilized backup press wheels and applied the extreme pressure in the press zone for a relatively short period of time but maintained a reduced dwell-time pressure for a relatively long period of time. The second embodiment contemplates the use of a chain for applying press pressure that maintains the full press pressure for the full dwell-time. Because of the relationship between the press pressure and dwell-time, discussed previously, the press pressure applied for a longer period of time need not be a extreme as that contemplated in the first embodiment.

It is contemplated that a wafering unit 200 described in this second embodiment be incorporated in a wafering machine 10 as disclosed in the first embodiment. Since the difference between the two machines resides in the wafering unit per se, the following discussion is limited to that feature.

The unit 200 comprises generally a wafer wheel 201, an endless flexible band 202 encircling the wafer wheel 201, a chain 203 trained about the wafer wheel 201 and driven by a sprocket 204. The wafer wheel 201 and sprocket 204 are respectively mounted on shafts 205 and 206. The wafer wheel 201 is particularly characterized as having a peripheral wafer forming surface 207. The wafer forming surface 207 may be of the same configuration as that described in the first embodiment. The wafer forming surface 207 is flanked by a pair of annular flanges 208, 208 (only one shown in FIGURE 10) which extend radially beyond the radial extent of the wafer forming surface 207 and are fixed to the wafer wheel by means of a plurality of bolts 209.

The width of the flexible band 202 is coextensive with the axial dimension of the peripheral wafer forming surface 207 and fits between the annular flanges 208, 208. The band 202 is adapted to overlay the wafer forming surface 207 in the circumferential segment designated as 210. The inner surface of the band 202 and the outwardly facing wafer forming surface 207 prescribe a wafer forming zone 210 therebetween.

Chain 203 engages the outer surface of band 202 in the area prescribing the wafer forming zone 210 and provides the force for forming the wafers therein. A linkage 211 connects the sprocket shaft 206 to the wafer wheel shaft 205. Linkage 211 provides a means for controlling chain tension which in turn determines the pressure in the peripheral press zone 210. A piston 212 carried by arm 213 journaled to sprocket shaft 206 is movable in a cylinder 214 formed in housing 215. The housing 215 is threadedly connected to arm 216. Arm 216 is pivotally mounted on shaft 205 so that the shaft 205 is free to rotate wafer wheel 201 relative to linkage 211. Cylinder 214 is in pressure communication through line 217 with a hydraulic accumulator similar to that described in the first embodiment; the pressure maintained therein acting upon piston 212 biases the wafer wheel 201 away from sprocket 204. This force is opposed by the chain 203 engagement upon band 202. Hence, hay trapped in the press zone 210 is subjected to the force acting thereon through band 202.

The circumferential length of the flexible band 202 is greater than the circumference of the wafer wheel 201. A portion 220 of the band 202 in the press zone area is held in close proximity to the wafer forming surface 207, and another portion 221 radially displaced outwardly of the wafer wheel 201 and is disposed between runs of the chain 203. The radially disposed portion 221 in combination with the wafer forming surface 207 defines a feed zone 222 located in advance of the press zone 210, and a discharge zone 223 located after the press zone 210 in the direction of rotation (indicated by the arrow). A feed auger 224 similar to that described in the first embodiment is mounted in the feed zone 222 and is oriented to feed hay between the flexible band 202 and the rotating wafer forming surface. A scraper wheel 225 similar to that described in the first embodiment is mounted in the discharge zone 223.

The operation of the invention as disclosed in the second embodiment is similar to that as disclosed in the first embodiment. Feed auger 224 feeds hay into the feed zone 222 where the rotating wafer wheel 201 traps hay between the flexible band 202 and the wafer forming surface 207. The hay in the press zone 210 is subjected to a press pressure as determined by the tension of chain 203. It should be noted that the wafer wheel 201 is movable relative to the stationary sprocket 204. Relative movement of the wafer wheel is determined by the accumulator pressure maintained in cylinder 214. It is contemplated that the accumulator pressure and effective area of piston 215 are selected to yield upon a press zone pressure of approximately 4,000 p.s.i. It should also be noted that as the thickness, or the radial dimension of the wafer with respect to wafer wheel 201 increases, the chain tension decreases through linkage 211 thereby maintaining the desired press pressure. Therefore, wafers, irrespective of thickness, are subjected to a constant press zone pressure. The press zone pressure is maintained on the wafers as the wafer wheel 201 rotates. Upon clearing the press zone 210, the compacted hay enters the discharge zone 217 where scraper 225 dislodges the wafer from the wafer forming surface 207.

What is claimed is:

1. A hay wafer forming machine comprising: a rotatable wheel having a periphery provided with a plurality of dies; a roller radially spaced from said periphery and therewith prescribing a press zone; means for changing the space between said roller and said periphery whereby pressure in said press zone may be controlled; a flexible member trained about said periphery and engaging a segment of said periphery and therewith prescribing a dwell-time zone, said dwell-time zone being disposed after said press zone in the direction of wheel rotation; means for maintaining a tension on said flexible member thereby providing pressure in said dwell-time zone; and means for feeding hay into said press zone whereby said hay is first subjected to said press zone pressure and then to said dwell-time zone pressure.

2. A hay wafering apparatus comprising a pair of rotatable wheels having confronting peripheries prescribing a press zone therebetween; means for feeding hay into said press zone, rotation of said wheels adapted to compress hay in said press zone; and a band encircling a peripheral segment of said wheels, said band being adapted to said peripheral segment for maintaining pressure in a non-slippage engagement upon hay in said press zone and movable along therewith as hay is moved through said press zone by rotation of said wheels.

3. A wafering apparatus comprising a pair of coplanar rotatable wheels, each of said wheels having circumferentially spaced wafer forming dies; an endless flexible band trained about peripheral portions of said wheels forming first and second runs, first and second rollers respectively engaging said first and second run, said first and second rollers being relatively movable thereby controlling tension of said band; and means for feeding hay between said band and the peripheries of said wheels.

4. A hay wafering apparatus comprising a pair of coplanar rotatable wafer die wheels, a band encircling said wafer die wheels forming oppositely disposed and parallel runs, a first roller cooperatively arranged with one of said wafer die wheels forming a first press zone therebetween, and a second roller cooperatively arranged with the other of said die wheels forming a second press zone therebetween, said first roller being engageable with one of said runs in said first press zone, said second roller being engageable with the other of said runs in said second press zone, said first and second rollers being movable relative to their respective companion wafer wheels for maintaining a spaced relationship therebetween, and said rollers being relatively movable for controlling band tension.

5. The apparatus as recited in claim 4 and further comprising first connecting means interconnecting one of said wafer wheels and said first roller, and second connecting means interconnecting the other of said wafer wheels and said second roller, said first and second connecting means including means for biasing said rollers toward said wheels, said biasing means being yieldable at a predetermined pressure.

6. The apparatus as recited in claim 5 and further comprising third connecting means interconnecting said first roller and said second roller, said third connecting means including means for biasing said first and said second rollers together, said biasing means being yieldable at a predetermined pressure.

7. A wafering apparatus comprising a first rotatable wheel having a series of wafer dies formed in its periphery, a second rotatable wheel having a series of wafer dies formed in its periphery, an endless flexible band trained about the peripheries of said first and said second wheels and therewith respectively prescribing first and second press zones, a first press roller engaging said band in the area of said first press zone and arranged with respect to said first wheel whereby a predetermined spaced relationship is maintained therebetween, a second press roller engaging said band in the area of said second press zone and arranged with respect to said second wheel whereby a predetermined spaced relationship is maintained therebetween, and means for feeding hay to said first and said second zones.

8. A hay wafer forming apparatus comprising a rotatable wheel having wafer forming dies in its periphery, an endless flexible band axially coextensive with said periphery and having a flat radially inwardly facing surface overlying a circumferential segment of said periphery and therewith prescribing a wafer dwell-time zone, said band having a flat radially outwardly facing surface extending generally tangentially of said wheel in advance of said dwell-time zone, a roller engageable with said radially outwardly facing surface of said band in the area overlying said circumferential segment, means for maintaining a constant predetermined spacing between said roller and said periphery, and means for feeding hay between said tangential extension of said band and said periphery.

9. The apparatus as recited in claim 8 and further including means disposed after the dwell-time zone in the direction of wheel rotation for extracting wafers from said wafer wheel.

10. The apparatus as recited in claim 8 and further including sensing means engaging said band in the area of the said dwell-time zone for detecting changes in the radial dimension of said dwell-time zone, and wherein said feed means is operatively responsive to said sensing means.

11. The apparatus as recited in claim 8 wherein the means for maintaining a constant predetermined spacing includes bias means interconnecting said wafer wheel and said roller for maintaining a constant predetermined force therebetween.

12. A hay wafer forming machine comprising:
a rotatable wheel having a plurality of wafer forming dies formed in its periphery;
press means cooperative with said wheel for forming wafers in said dies;
a flexible member overlying a segment of said periphery and cooperative therewith for maintaining a dwell-time pressure on wafers formed in said dies by said press means; and
means disposed after said overlain segment in the direction of rotation of said wheels for scraping the surface of each of said dies.

13. The machine as recited in claim 12 wherein the scraping means includes a rotary element having radial scraper arms, said rotary element being rotatable about an axis parallel to the axis of rotation of said wheel, and each of said scraper arms having a scraper blade complementary shaped to fit the configuration of said dies, said rotary element and said wheel being rotatable in timed relation whereby each of said blades confronts and scrapes the surface of each die.

14. In a wafer forming machine including a rotatable wafer wheel having a plurality of wafer dies formed in its periphery, and a wafer press roller cooperative with said wafer wheel for forming wafers in said dies, a scraper apparatus comprising a scraper wheel mounted for rotation about its axis, said wheel having peripheral die scraping elements aligned with the periphery of said wafer wheel, means for rotating said scraper wheel in timed relation with said wafer wheel whereby said elements scrape said dies as said dies pass said scraper wheel.

15. A hay wafering apparatus comprising a pair of rotatable wheels having confronting peripheries prescribing a press zone therebetween, means for feeding hay into said press zone, rotation of said wheels being adapted to compress material in said press zone; means cooperable with one of said wheels for maintaining pressure for a predetermined time upon said hay after compression thereof; a heating element disposed radially inwardly of one of said wheels, said heating element being stationary relative to said press zone, said heating element being operative to heat hay accommodated in said press zone.

16. In a wafer forming apparatus of the type having a wafer die wheel and a wafer press roller arranged to have their peripheries in confronting relation defining a wafer press zone therebetween, a wafer dwell-time apparatus comprising a flexible member trained about the periphery of said die wheel and therewith prescribing a wafer dwell-time zone, said flexible member extending between the confronting peripheries of said wafer die wheel and said wafer press roller whereby said press zone and dwell-time zone overlap, and force means operative upon said flexible member for maintaining a predetermined dwell-time pressure in said dwell-time zone.

References Cited

UNITED STATES PATENTS

| | | | |
|---|---|---|---|
| 70,983 | 11/1867 | Fisher | 25—78 |
| 464,600 | 12/1891 | Anderson | 100—153 XR |
| 474,802 | 5/1892 | Anderson | 100—153 |
| 598,456 | 2/1898 | Wenk | 100—152 XR |
| 2,096,097 | 10/1937 | Fowle | 100—153 |
| 2,280,880 | 4/1942 | Anderson | 100—43 |
| 3,015,199 | 1/1962 | McKeon et al. | 56—1 |
| 3,023,559 | 3/1962 | Richey et al. | 56—1 |
| 3,123,958 | 3/1964 | Carruthers | 100—153 XR |
| 3,149,585 | 9/1964 | Forth et al. | 107—14 |
| 3,199,793 | 8/1965 | Sabi | 100—430 XR |
| 3,213,783 | 10/1965 | May et al. | 100—100 |
| 3,352,229 | 11/1967 | Morse | 110—38 |

FOREIGN PATENTS

| | | |
|---|---|---|
| 1,146,687 | 4/1963 | Germany. |
| 226,126 | 12/1924 | Great Britain. |
| 485,584 | 5/1938 | Great Britain. |
| 19,734 | 6/1903 | Sweden. |
| 84,726 | 4/1920 | Switzerland. |

BILLY J. WILHITE, *Primary Examiner.*

U.S. Cl. X.R.

18—21; 25—75; 56—1; 100—43, 74, 93, 152, 153, 177, 211